Jan. 6, 1942.                B. W. WEEKES                2,268,686
                           PLASTIC LIQUEFIER
                          Filed Nov. 2, 1940
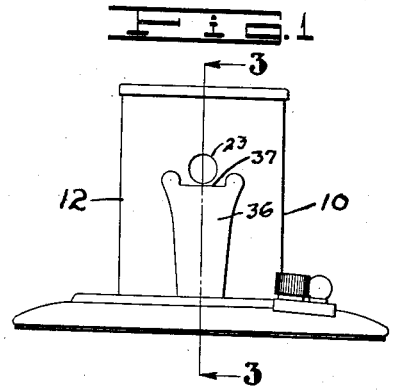
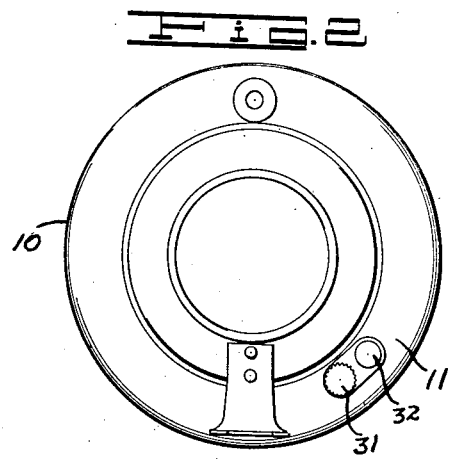
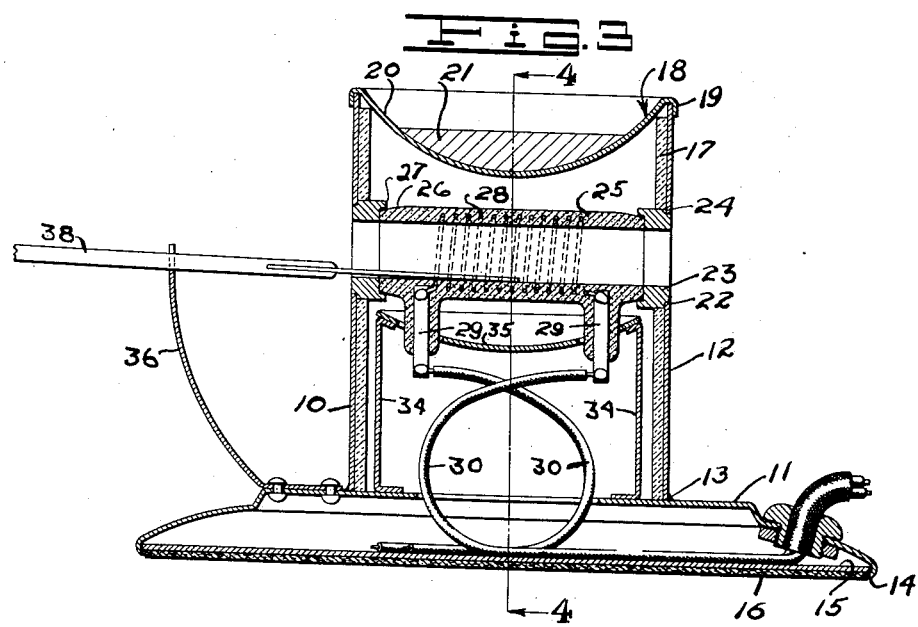
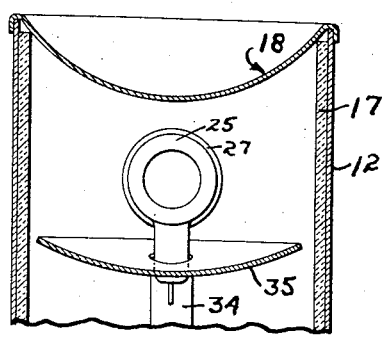
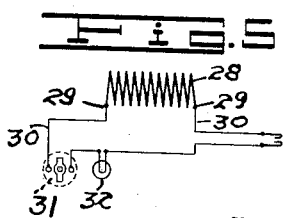
INVENTOR.
B. W. WEEKES
BY Patented Jan. 6, 1942

2,268,686

UNITED STATES PATENT OFFICE 2,268,686

PLASTIC LIQUEFIER

Byron Willis Weekes, Pasadena, Calif.

Application November 2, 1940, Serial No. 364,048

5 Claims. (Cl. 219—22)

This invention relates to plastic liquefiers. The general object of the invention is to provide an improved portable apparatus for maintaining a plastic in molten condition and for heating a tool by means of which the plastic may be applied.

Another object of the invention is to provide a plastic liquefier with novel means for supporting a heating element therein.

Another object of the invention is to provide a plastic liquefier including a novel supporting means for a heating element and for a receptacle.

Other objects and advantages of the invention will be apparent from the following description taken in connection with the accompanying drawing, wherein:

Fig. 1 is a front elevation of a plastic liquefier embodying the features of my invention;

Fig. 2 is a top plan view of my liquefier;

Fig. 3 is a section, on an enlarged scale, taken on line 3—3, Fig. 1;

Fig. 4 is a fragmentary section taken on line 4—4, Fig. 3, with the heating member in elevation; and Fig. 5 is a wiring diagram.

Referring to the drawing by reference characters I have shown my invention as embodied in a plastic liquefier which is indicated generally at 10.

As shown the device includes a resilient metal base 11 having an upstanding slightly resilient, metal column 12 which may be welded thereto as at 13. At its lower edge the base includes an inturned flange portion 14 which engages a bottom 15. The relation of the parts 14 and 15 is such that the part 15 may be snapped into place when pressure is applied thereto and when released the natural resiliency of the material will hold the parts assembled. The bottom 15 is provided with a felt or other base 16 which may be glued or otherwise held in place.

The column 12 is provided with a heat insulating lining 17 which may be asbestos and the collar at its upper end receives a closure 18 which includes an external flange 19 and a central receptacle portion 20 in which the plastic 21 to be heated is placed.

The column 12 is shown as cylindrical and is provided with diametrically opposed apertures 22 in each of which one end of a collar 23 is disposed. The collar 23 includes a shoulder 24 to limit its outward movement. The collar 23 may be brazed or otherwise secured in place.

The column 12 being more or less resilient the opposed sides may be slightly spread and in this manner the housing 25 of a heating element is sprung into place. The housing 25 has tapered ends 26 which engage within shoulders 27 on the collars 23 to hold the parts assembled.

The housing 25 includes a heating element 28 from which terminals 29 extend and are connected to leads 30. The leads 30 include a switch 31, a signal light 32, and suitable terminals 33 for connecting to a source of current.

Mounted within the column 12 I show a pair of brackets 34 which support a heat reflector 35 the upper surface of which reflects heat from the element 28 against the bottom of the receptacle 20.

The base 11 includes an arm 36 the upper portion of which includes a tool supporting portion 37 which is aligned with the collar 23 and heating element housing 25.

In use the plastic 21 is placed in the receptacle 20 and current is turned on by the switch 31 thus illuminating the signal light 32. The plastic working tool such as shown at 38 is placed within the housing 35. When both the plastic and the tool are heated, the plastic is removed by the tool and is applied.

The apparatus is particularly adapted for use by embalmers for heating plastic material, but I do not wish to be limited to such use.

From the foregoing description it will be apparent that I have invented a novel plastic liquefier which can be economically manufactured and which is highly efficient for the intended purpose.

Having thus described my invention, I claim:

1. In a plastic liquefier, a base, a hollow resilient column mounted on said base, said column having opposed apertures therein, a collar mounted in each aperture, a heating member including a heating element and a housing therefore, said housing having ends engaging said collars.

2. In a plastic liquefier, a base, a hollow column mounted on said base, said column having opposed apertures therein, a collar mounted in each aperture, each collar having a shoulder engaging the column, a heating member including a heating element and a housing therefore, said housing having ends fitted within said second shoulders on said collars, and a heat reflector arranged beneath said heating member.

3. In a plastic liquefier, a base, a hollow resilient column mounted on said base, a bottom for said base, said column having apertures therein, a collar mounted on each aperture, each collar having a shoulder engaging the inner wall of the column, each collar having a second shoulder remote from the column, a heating member including a heating element and a housing therefor, said housing having ends fitted within said second shoulders on said collars, an arcuate heat reflector arranged beneath said heating element, and a closure for the column.

4. In a plastic liquefier, a base, a hollow resilient column mounted on said base, a bottom for said base, said column having opposed apertures therein, a collar mounted in each aperture, each collar having a shoulder engaging the inner wall of the column, each collar having a second shoulder remote from the column, a heating member including a heating element and an elongated housing therefor, said housing ends being fitted within said second shoulders on said collars, a bracket on the base within the column, a heat reflector mounted on said bracket and arranged beneath said heating member, and a closure for the column.

5. In a plastic liquefier, a base, a hollow resilient column mounted on said base, a bottom for said base, said column having diametrically opposed apertures therein, a collar mounted in each aperture, each collar having a shoulder engaging the inner wall of the column, each collar having a second shoulder remote from the column, a heating member including a heating element and a housing therefor having tapered ends, said housing tapered ends being fitted within said second shoulders on said collars, a pair of brackets on the base within the column, an arcuate heat reflector mounted on said brackets and arranged beneath said heating member, and a closure for the top of the column, a tool support member on the base, said tool support member having a horizontal portion secured to said base and a portion extending upwardly and outwardly from the column and having a tool engaging portion on the upper end thereof substantially aligned with said heating member housing.

BYRON WILLIS WEEKES.